United States Patent Office 3,180,866
Patented Apr. 27, 1965

3,180,866
SUBSTITUTED SULFAPYRIMIDINE DERIVATIVES
Harald Horstmann, Wuppertal-Vohwinkel, Udo Wörffel, Krefeld-Uerdingen, and Sophie Wirtz, Wuppertal-Elberfeld, Germany, assignors to Farbenfabriken Bayer Aktiengesellschaft, Leverkusen, Germany, a German corporation
No Drawing. Filed Jan. 23, 1962, Ser. No. 168,232
Claims priority, application Germany, Jan. 26, 1961, F 33,067; Feb. 7, 1961, F 33,151
10 Claims. (Cl. 260—239.75)

This invention relates to novel sulfapyrimidines and to methods for producing the same. More particularly, the present invention relates to novel, pharmaceutically valuable sulfapyrimidines which are particularly effective in inducing a significant depression of the blood sugar level.

Certain thioureas and compounds such as 5-sulfa-2-alkyl-1,3,4-thiodiazoles and 5-sulfa-2-alkyl-1,3,4-oxodiazoles have been suggested heretofore as, for example, in B. Medizin und Chemie, vol. VI, page 61 ff. (1958), as having a blood sugar depressing action. Despite numerous investigations undertaken in this field, no other heterocyclically substituted sulfonamides possessing a practicable antidiabetic activity appear to have been produced as reflected by the technical literature.

Accordingly, antidiabetic compounds have now been discovered that are capable of effecting a significant depression of the blood sugar level. These compounds have the formula:

(I) 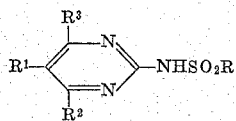

wherein R is a branched or unbranched aliphatic radical of from 1 to 12 carbon atoms, and preferably a lower alkyl radical; a cycloaliphatic radical, and preferably a cycloalkyl radical, of from 5 to 7 carbon atoms, an unsubstituted araliphatic radical or an araliphatic radical substituted by lower alkyl and alkoxy radicals, the latter containing preferably a lower alkyl radical, or an aromatic, preferably phenyl, radical, unsubstituted or substituted by lower alkyl, alkoxy (again containing preferably a lower alkyl moiety), halogen and amino radicals; $R^1$ is phenyl or acetyl; $R^2$ is a hydrogen atom or an alkoxy radical (and preferably, when the latter, one that contains a lower alkyl moiety); and $R^3$ is hydrogen, a methyl radical, or an alkoxy (containing preferably a lower alkyl moiety) radical; and wherein $R^3$ is methyl solely when $R^1$ is acetyl.

The aforesaid compounds are prepared by the reaction of a compound of the formula:

(II)    R—SO₂—X wherein R is as defined above; X is a halogen atom, i.e. chlorine or bromine, an amino radical or a guanido radical with a second reactant selected from the group composed of a 2-amino-5-phenylpyrimidine, a 2-halo-5-phenylpyrimidine wherein the halogen substituent is chlorine or bromine, and a compound of the formula:

(III) 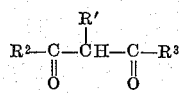

wherein R', $R^2$ and $R^3$ are as represented above; provided, also as described above, that $R^3$ is methyl only when R' is acetyl; and the corresponding compounds containing the funtional derivatives of the ketonic oxygen functions thereof; provided, of course, that when X is a halogen atom in Formula II above, the second reactant is a 2-amino-5-phenylpyrimidine; when X is amino, the second reactant aforesaid is a 2-halo-5-phenylpyrimidine; and when X is a guanido radical, the second reactant is a compound of Formula III above; and provided further that where the reactants involved include a sulfaguanidine and a compound of Formula III, the hydroxy groups which may form at the 4-C and 6-C positions of the resulting pyrimidine nucleus are reduced and replaced, in effect, by hydrogen.

The reactant compounds encompassed by Formula III above are thus embraced within the following formulae:

(IV) 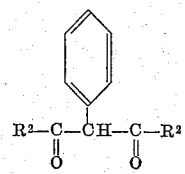

and (V) 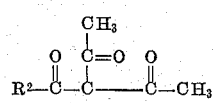

wherein $R^2$ has the values defined above.

Illustrative of the compounds of general Formula III above and functional derivatives thereof are members selected from the group consisting of phenyl malonic acid ester, α-formyl acetic acid ester, and salts thereof, alkoxymethylenephenyl acetic acid ester (e.g. methoxymethylenephenyl acetic acid ester, ethylmethylenephenyl acetic acid ester), phenylamalondialdehyde and the corresponding acetals thereof, alkoxymethylenephenylacetaldehyde (e.g. methoxymethylenephenylacetaldehyde, ethoxymethylenephenylacetaldehyde), as well as β-dialkylamino-α-phenylacroleins (e.g. β-diethylamino-α-phenylacrolein), obtainable from phenylacetaldehyde acetal or ω-alkoxy styrenes in a manner and by a process similar to that described by W. Rylski, F. Sorm, and Z. Arnolds, Collection of Czechoslovak Chem. Comm., vol. 24, p. 1667 (1959). Further illustrative of the aforesaid compounds for use herein are members selected from the group consisting of acetylacetoacetic ester, formylacetylacetone and its salts, alkoxymethyleneacetylacetone, and dialkylaminomethyleneacetylacetone (e.g. methoxymethyleneacetylacetone, ethoxymethyleneacetylacetone), dimethylaminomethyleneacetylacetone and diethylaminomethyleneacetylacetone. In each of the aforesaid compounds containing alkyl or alkoxy substituents the alkyl moiety is, in each instance, preferably a lower alkyl substituent.

The reactants, such as 2-amino-5-phenylpyrimidine and 2-amino-4-methyl-5-acetylpyrimidine may be prepared conveniently employing a ring-closure condensation similar to that described with relation to the reaction of a sulfaguanidine with a compound of the class described in general Formulae II above and their functional derivatives as indicated; the procedure differing substantially only in the use of a guanidine wherein the sulfonyl (—SO₂—) moiety is not present.

The preferred antidiabetic compounds of the invention may be said to be encompassed by the general formula:

(VI) 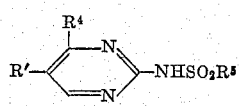

wherein R' is a phenyl or acetyl and $R^4$ is hydrogen or methyl; provided that only when R' is acetyl, $R^4$ is methyl; and $R^5$ is a member of the group composed of phenyl, p-methylphenyl, p-chlorophenyl, p-aminophenyl, p-methoxyphenyl, benzyl, o,o-dichlorobenzyl, and a lower alkyl radical, e.g. methyl and pentyl.

The following examples are further illustrative of the invention.

Example 1

Preparation of the compound, 2 - (4' - toluenesulfonamido)-5-phenylpyrimidine, of the formula:

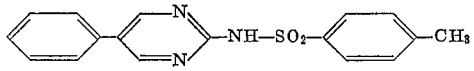

Into a mixture of 300 milliliters (ml.) of methylene chloride and 37 grams (g.) of dimethyl formamide, 50 g. of phosgene are introduced at 0° C.–5° C. To this mixture is added dropwise with cooling and stirring 67 g. of ω-methoxy-styrene. After cooling, the flask content is heated to boiling for eight hours and, after renewed cooling, is neutralized by the dropwise addition of a sodium methylate solution. Separated sodium chloride is filtered off and the solvent driven off. The residual syrup weighs about 110 g.

Into a suspension of 106 g. of p-toluenesulfaguanidine in 300 ml. of methanol and 278 ml. of a sodium methylate solution (corresponding to 1 mol of sodium methylate), there is introduced at 70° C. with stirring the product of the Vilsmeier reaction. The reaction mixture is heated under reflux for six hours, the methanol is then driven off and the residue taken up in water, whereby unreacted sulfaguanidine precipitates. It is removed by filtration, the filtrate is stirred with animal charcoal, filtered until clear and the sulfonamide precipitated with glacial acetic acid. The crude product is purified by dissolving it in dilute aqueous ammonia, treated with animal charcoal, while hot, filtered, and the 2-(4'-toluenesulfonamido)-5-phenylpyrimidine is precipitated with glacial acetic acid. Yield: 97 g. or 60% of the theoretical, M.P. 228° C., Kofler block (in the following designated as K.b.).

In an analogous manner there are prepared:

2-benzenesulfonamido-5-phenylpyrimidine (M.P. 224° C., K.b.), of the formula:

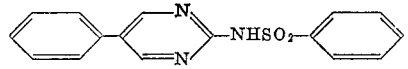

2-(4' - chlorobenzenesulfonamido - 5 - phenylpyrimidine (M.P. 234° C. K.b.), of the formula:

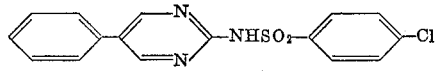

2-(4'-aminobenzenesulfonamido) - 5 - phenylpyrimidine (M.P. 258° C. K.b.), of the formula:

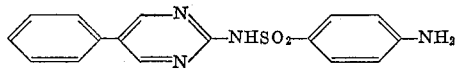

Example 2

Preparation of the compound, 2-(4'-methoxybenzenesulfonamido)-5-phenylpyrimidine, of the formula:

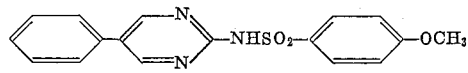

To 8.6 g. of 2-amino-5-phenylpyrimidine (M.P. 162–163° C.) are added 50 ml. of pyridine, wherein the pyrimidine is dissolved. To this solution, 10.3 g. of p-methoxybenzenesulphochloride are added with stirring. Stirring is continued overnight at room temperature and then at 100° C. for a half hour. The reaction product is introduced into dilute hydrochloric acid, the precipitate filtered off with suction and dissolved in dilute aqueous ammonia, treated with animal charcoal, while hot, and filtered until clear; 2-(4'-methoxybenzenesulfonamido)-5-phenylpyrimidine is precipitated by the addition of glacial acetic acid; (colorless crystals); (M.P. 220° C., K.b.).

In analogous manner there are prepared:

2-benzylsulfonamido-5-phenylpyrimidine (M.P. 240° C., K.b.), of the formula:

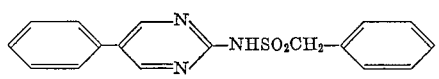

2-(n-pentylsulfonamido)-5-phenylpyrimidine (M.P. 247° C., K.b.), of the formula:

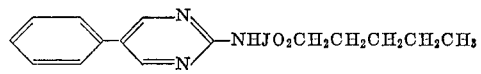

2-(2',6' - dichlorobenzylsulfonamido) - 5 - phenylpyrimidine (M.P. 240° C., K.b.), of the formula:

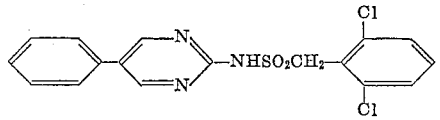

2-methylsulfonamido-5-phenylpyrimidine (M.P. 245° C., K.b.), of the formula:

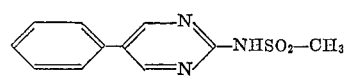

Example 3

Preparation of the compound, 2 - (4' - toluenesulfonamido)-4-methyl-5-acetylpyrimidine, of the formula:

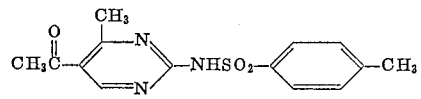

Sodium (2.3 g.) is dissolved in 250 ml. of absolute alcohol. To this solution are added 21.3 g. of 4-toluenesulfaguanidine, and 15.6 g. of ethoxymethyleneacetylacetone in 25 ml. of alcohol are then added dropwise. The reaction mixture is kept at 50° C. for thirty minutes and then heated to boiling for one hour. The alcohol is subsequently driven off, the residue taken up in water, unreacted toluenesulfaguanidine filtered off with suction and the sulfonamide precipitated with acetic acid from the filtrate. The crude product is purified by precipitation (dissolution in dilute aqueous ammonia and precipitation with glacial acetic acid) with subsequent recrystallization from alcohol. Yield: 20 g. or 66% of the theoretical of [2-(4' - toluenesulfonamido) - 4 - methyl-5-acetylpyrimidine], M.P. 212° C., K.b.

In analogous manner there are obtained:

2-(4'-aminobenzenesulfonamido) - 4 - methyl-5-acetylpyrimidine, M.P. 228° C., K.b., of the formula:

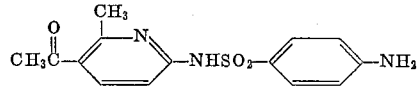

2-(4'-chlorobenzenesulfonamido)-4-methyl-5-acetylpyrimidine, M.P. 194° C., K.b., of the formula:

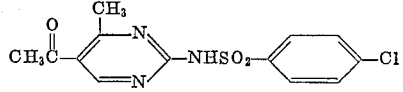

and 2-benzenesulfonamido-4-methyl-5-acetylpyrimidine, M.P. 194° C., K.b., of the formula:

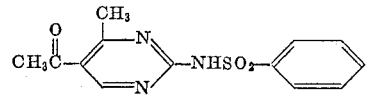

Example 4

Preparation of the compound, 2-(4'-toluenesulfonamido)-4-methyl-5-acetylpyrimidine, of the formula:

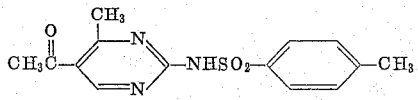

A suspension is formed by addition of 7.6 g. of 2-amino-4-methyl-5-acetylpyrimidine to 30 ml. of pyridine. To this suspension are added 9.5 g. of p-toluenesulfochloride at room temperature. The reaction mixture is stirred first at 80° C. for one hour and then at room temperature overnight, it is then introduced into dilute hydrochloric acid and the precipitate formed is filtered off. The crude product is digested in aqueous ammonia, treated with animal charcoal, briefly heated to boiling and filtered. Upon acidification of the filtrate, 2-(4'-toluenesulfonamido)-4-methyl-5-acetylpyrimidine separates, M.P. 211° C., K.b.

In analogous manner there is prepared:

2-(4'-methoxybenzenesulfonamido)-4-methyl - 5 - acetylpyrimidine, M.P. 186° C., K.b., of the formula:

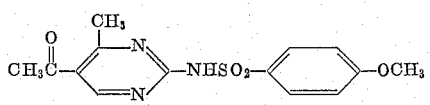

What is claimed is:
1. The compound, 2-benzylsulfonamido-5-phenylpyrimidine.
2. The compound, 2-(n-pentylsulfonamido)-5-phenylpyrimidine.
3. The compound, 2-(2',6'-dichlorobenzylsulfonamido)-5-phenylpyrimidine.
4. The compound, 2-methylsulfonamido-5-phenylpyrimidine.
5. The compound, 2-(4'-toluenesulfonamido)-4-methyl-5-acetylpyrimidine.
6. The compound, 2-(4'-aminobenzenesulfonamido)-4-methyl-5-acetylpyrimidine.
7. The compound, 2-(4'-chlorobenzenesulfonamido)-4-methyl-5-acetylpyrimidine.
8. The compound, 2-benzenesulfonamido-4-methyl-5-acetylpyrimidine.
9. The compound, 2-(4'-methoxybenzenesulfonamido)-4-methyl-5-acetylpyrimidine.
10. A chemical compound selected from the group consisting of 2-benzylsulfonamido-5-phenyl-pyrimidine; 2-(n-pentylsulfonamido)-5-phenylpyrimidine; 2-(2',6' - dichlorobenzylsulfonamido)-5-phenylpyrimidine; 2-methylsulfonamido-5-phenylpyrimidine; 2-(4'-toluenesulfonamido)-4-methyl-5-acetylpyrimidine; 2-(4'-aminobenzenesulfonamido)-4-methyl-5-acetylpyrimidine; 2-(4'-chlorobenzenesulfonamido)-4-methyl-5-acetylpyrimidine; 2 - benzenesulfonamido-4-methyl-5-acetylpyrimidine; and 2-(4'-methoxybenzenesulfonamido)-4-methyl - 5 - acetylpyrimidine.

References Cited in the file of this patent
UNITED STATES PATENTS

| | | |
|---|---|---|
| 2,435,002 | Horstmann et al. | Jan. 27, 1948 |
| 2,494,524 | Sprague | Jan. 10, 1950 |
| 2,540,356 | Sprague | Feb. 6, 1951 |
| 3,055,899 | Druey et al. | Sept. 25, 1952 |

OTHER REFERENCES

Rose et al.: J. Chem. Soc., pp. 81–85 (1946).

Hauser et al.: J. Org. Chem., vol. 18, pp. 588–93 (1953).

Ruschig et al.: Arzn. Forsch, vol. 8, No. 7A, pp. 448–454 (1958).

Horstmann et al.: Arzn. Forsch, vol. 11, pages 682 to 684 (1961).